(12) United States Patent
Winfough et al.

(10) Patent No.: US 7,097,399 B2
(45) Date of Patent: Aug. 29, 2006

(54) CUTTING MACHINE FOR GEAR SHAPING OR THE LIKE

(75) Inventors: Bob Winfough, Belvidere, IL (US);
Loyd L. Koch, Rockford, IL (US);
Wayne Densmore, Springfield, VT (US)

(73) Assignee: Bourn & Koch, Inc., Rockford, IL (US)

( * ) Notice: Subject to any disclaimer, the term of this patent is extended or adjusted under 35 U.S.C. 154(b) by 180 days.

(21) Appl. No.: 10/922,794

(22) Filed: Aug. 20, 2004

(65) Prior Publication Data

US 2005/0129474 A1 Jun. 16, 2005

(51) Int. Cl.
*B23F 9/00* (2006.01)
*B23F 19/06* (2006.01)
*B23C 1/12* (2006.01)

(52) U.S. Cl. .............................. 409/32; 409/31; 409/33; 409/185; 409/201; 409/231; 409/235; 409/210; 409/36; 310/12; 408/141

(58) Field of Classification Search ............ 409/31–37, 409/42–47, 49, 58, 185, 199, 201, 211, 216, 409/231, 210, 214, 218, 235; 408/129, 141–142, 408/236, 234; 310/12
See application file for complete search history.

(56) References Cited

U.S. PATENT DOCUMENTS

| 3,628,359 | A | | 12/1971 | Tlaker |
| 3,741,659 | A | | 6/1973 | Jones, Jr. |
| 3,806,691 | A | * | 4/1974 | Roach ........................ 408/236 |
| 4,125,056 | A | | 11/1978 | Tlaker et al. |
| 4,136,302 | A | | 1/1979 | Tlaker et al. |
| 4,167,218 | A | * | 9/1979 | Horiuchi et al. ............ 409/233 |
| 4,254,690 | A | | 3/1981 | Tlaker et al. |
| 4,533,858 | A | | 8/1985 | Tlaker |
| 4,542,638 | A | | 9/1985 | Tlaker |
| 4,629,377 | A | | 12/1986 | Tlaker et al. |
| 4,784,538 | A | | 11/1988 | Tlaker et al. |
| 5,009,554 | A | * | 4/1991 | Kameyama et al. ........ 409/231 |
| 5,061,128 | A | * | 10/1991 | Jahr et al. ..................... 409/34 |
| 5,066,897 | A | * | 11/1991 | Ueda et al. .................. 318/135 |
| 5,345,390 | A | | 9/1994 | Greenip, Jr. et al. |
| 5,368,539 | A | * | 11/1994 | Mills et al. ..................... 483/1 |
| 5,517,746 | A | * | 5/1996 | Cox et al. ...................... 29/560 |
| 6,099,217 | A | * | 8/2000 | Wiegand et al. ............ 409/201 |
| 6,174,271 | B1 | * | 1/2001 | Kosmowski ..................... 483/1 |
| 6,285,098 | B1 | * | 9/2001 | Nestler et al. ................. 310/12 |
| 6,439,813 | B1 | * | 8/2002 | Repossini ..................... 409/235 |
| 6,705,408 | B1 | * | 3/2004 | Kim et al. ................... 173/114 |
| 6,835,033 | B1 | * | 12/2004 | Fioroni ........................ 409/237 |

* cited by examiner

*Primary Examiner*—Erica Cadugan
(74) *Attorney, Agent, or Firm*—Reinhart Boerner Van Deuren P.C.

(57) ABSTRACT

A cutting machine includes linear electrical actuation for controlling linear reciprocating movement of a spindle and cutting tool. The cutting machine is suited for gear shaping cutting operations and the like. Linear electrical actuation may be used to control position of a hydraulic valve within the spindle, which controls hydraulic actuation and linear movement of the spindle. Linear electrical actuation may also be used to pivot the spindle to relieve the cutting and/or during the cutting stroke for gear crowning operations. A rotary actuator is also disclosed as incorporated into the pivoting saddle of such a cutting machine.

35 Claims, 15 Drawing Sheets

CUTTING MACHINE FOR GEAR SHAPING OR THE LIKE

FIELD OF THE INVENTION

The present invention relates generally to automated machine tooling and more particularly to automated cutting machinery in which a reciprocating spindle iS linearly reciprocated to drive a cutting tool relative to a workpiece.

BACKGROUND OF THE INVENTION

Cutting machinery such as gear shaping machines are used to create gear teeth along the outer or inner periphery surface of gear members. As will be readily be appreciated, gears come in a wide variety of shapes and sizes, with different shapes and sizes of teeth being provided along a gear surface. Additionally, some gears will have straight gear teeth and flutes therebetween which are parallel with the rotational axis of the gear while other gears will have helical or slanted gear teeth and flutes therebetween relative to the rotational axis of the gear. Additionally, some gears will be crowned in that one or both sides of the gear will be rounded as the gear teeth and flutes approach one or both side edges of the gear.

A common approach to providing machinery for shaping gears in disclosed in Tlaker et al., U.S. Pat. No. 4,125,056, the entire disclosure of which is hereby incorporated by reference. As disclosed therein, a machine includes a hydraulically operated reciprocating spindle which drives a vertical cutter for shaping a gear. The spindle comprises a piston which is slidable in a cylinder. The spindle piston is a differential piston in that it has two faces of different area to which hydraulic fluid under pressure is controllably directed. The larger area piston face is used to drive the spindle downwardly in the cutting stroke and the smaller area piston face is used to drive the spindle upwardly in the return stroke. Further, the spindle piston has an axial bore which receives a vertically reciprocating valve. The valve is reciprocated in a manner which causes a spindle to move downwardly at a controlled lower velocity and moved upwardly on the return stroke at a much higher velocity to provide a greater overall production efficiency. The way in which the machinery is driven is through mechanical cam and inversely related lever/linkage mechanisms which require complex spring housings, mechanical linkages and adjustment mechanisms.

In a machine such as Tlaker et al., the spindle is carried for linear reciprocation within a saddle that is pivotably connected to a main frame. During the downward cutting stroke, the spindle is kept in a true vertical orientation to facilitate cutting action between the cutter and the workpiece. However, the saddle (in which the spindle linearly reciprocates) is pivotably mounted as such and during the return stroke, the saddle and spindle are pivoted slightly to a slightly offset vertical orientation by virtue of mechanical cam action to relieve the cutter from the cutting surface and thereby allow the spindle and cutter to retract free and clear of the workpiece.

As it relates to the general state-of-the-art, additional reference can be had to U.S. Pat. Nos. 3,628,359; 4,136,302; 4,254,690; 4,533,858; 4,542,638; 4,629,377; 4,784,538; and 5,345,390, the entire disclosures of which are also hereby incorporated by reference in their entireties. Additional reference can be had to U.S. Pat. No. 3,741,659.

Machinery of the type disclosed in Tlaker et al. have been commercially sold under the trademark HYDROSTROKE® and have met with substantial commercial success. With that being said, the relevant art has largely remained relatively stagnant from a mechanical cam timing, control, and hydraulic operation standpoint. As will be readily appreciated once the present invention is understood, there are several deficiencies heretofore that have not been realized in such gear shaping machines which are hereby improved upon with the present invention.

BRIEF SUMMARY OF THE INVENTION

There are several different aspects of the present invention which are believed to be independently patentable.

One aspect of the present invention is directed toward a hydraulic cutting machine for driving a cutting tool in relation to a workpiece in which an electric actuator replaces the mechanical cam and spring linkage mechanisms to act upon the valve and thereby control hydraulic actuation of the spindle. A machine of this type includes a support frame, a work table mounted to the support frame and a saddle supported by the support frame above the work table. A spindle is carried by the saddle for linear reciprocation and has an output end adapted for attachment to the cutting tool. A hydraulic cylinder is integrally connected (e.g. unitarily formed with, attached and/or mounted) to the saddle. The piston is slidably mounted within the hydraulic cylinder for linear reciprocation and divides the hydraulic cylinder into upper and lower chambers. The piston is integrally connected to the spindle and is of the differential type having opposed working surfaces of different working areas. The hydraulic passageway is routed through the saddle extending from an inlet port which connects to a hydraulic pressure source; and an outlet port which connects to a hydraulic sump. The valve is carried in the saddle for linear reciprocation and regulates hydraulic flow along the hydraulic passageway to the upper chamber. The valve has a first state restricting hydraulic flow to the upper chamber (and also draining the upper chamber) to hydraulically drive the piston and spindle in a first direction and a second state facilitating hydraulic flow between the upper and lower chambers to drive the piston and spindle in a second opposite direction.

With regard to this first aspect of the present invention, a further feature may include that the electric actuator is a linear motor comprising a linear motor coil and a linear motor magnet carriage. Yet, further features may include a linear bearing system to guide sliding movement of the electric actuator, braking means for braking the linear motor carriage, and a linear encoder system to provide position feedback to an electronic controller for closed loop control over the linear motor.

Another aspect of the present invention is directed toward a cutting machine for driving a cutting tool which uses a linear electric actuator for relieving or backing off the cutting tool from the workpiece during the return stroke of the spindle and cutting tool (and for tapering or crowning a workpiece). A machine of this type includes a support frame, a work table mounted to the support frame, and a saddle pivotably mounted to the support frame via a pivot connection above the work table. A spindle is carried by the saddle for linear reciprocation and has an output end for attachment to the cutting tool. Actuation means such as a hydraulic actuator, other fluid powered actuator, electrical actuator, or mechanical linkage is provided for reciprocating the spindle linearly upwardly and downwardly. The linear electrical actuator acts between the saddle and the support frame at a location offset from the pivot connection to operatively pivot the saddle in a limited range relative to the support frame to thereby effect the back off or relieving action.

Further features of the invention according to this aspect may include pivotably mounting the saddle to the support frame with a plurality of flexure plates; using a linear motor which comprises a linear motor coil and a linear motor magnet carriage as the linear electric actuator; using a linear encoder system for providing feedback to an electronic controller for closed loop control over the linear motor. Yet a further feature which may be provided with this aspect of the invention is the provision of a back off lever that is pivotably mounted to the support frame and which has one end acting on the electric actuator and another end acting upon the saddle through flexure plates. The lever can be provided with a known ratio to effect a desired amount of pivoting movement per a linear movement of the actuator.

Another aspect of the present invention is the incorporation of an electric rotary actuator integrally with the saddle of a cutting machine for controllably rotating a cutting tool in relation to a workpiece to precise and accurate angular positions during the downward cutting stroke. The cutting machine comprises a support frame, a work table mounted to the support frame, and a saddle carried by the support frame above the work table for movement relative to the support frame. A spindle is carried by the saddle for linear reciprocation and has an output end for attachment to the cutting tool. Actuation means is provided for linearly reciprocating the spindle along a spindle axis to effectuate cutting action. An actuator is also provided which acts upon the saddle to move the saddle relative to the support frame. The electric rotary actuator is integral with the saddle and surrounds the spindle. The actuator includes a stator mounted to the saddle and a rotor rotatably mounted via bearings to the saddle for rotation relative to the saddle. The rotor is rotatably coupled (e.g. with splines) such that the rotor and spindle rotate in unison about the spindle axis while the spindle is also linearly slidable along the spindle axis relative to the rotor.

Other aspects, objectives and advantages of the invention will become more apparent from the following detailed description when taken in conjunction with the accompanying drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
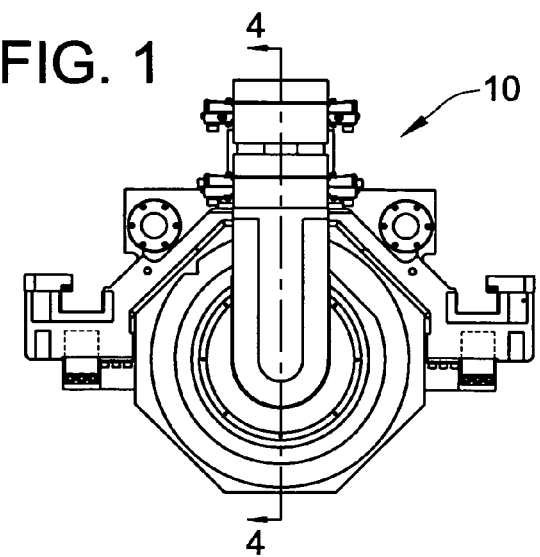
FIG. 1 is top view of a hydraulic cutting machine in accordance with an embodiment of the present invention.
Figure 2:
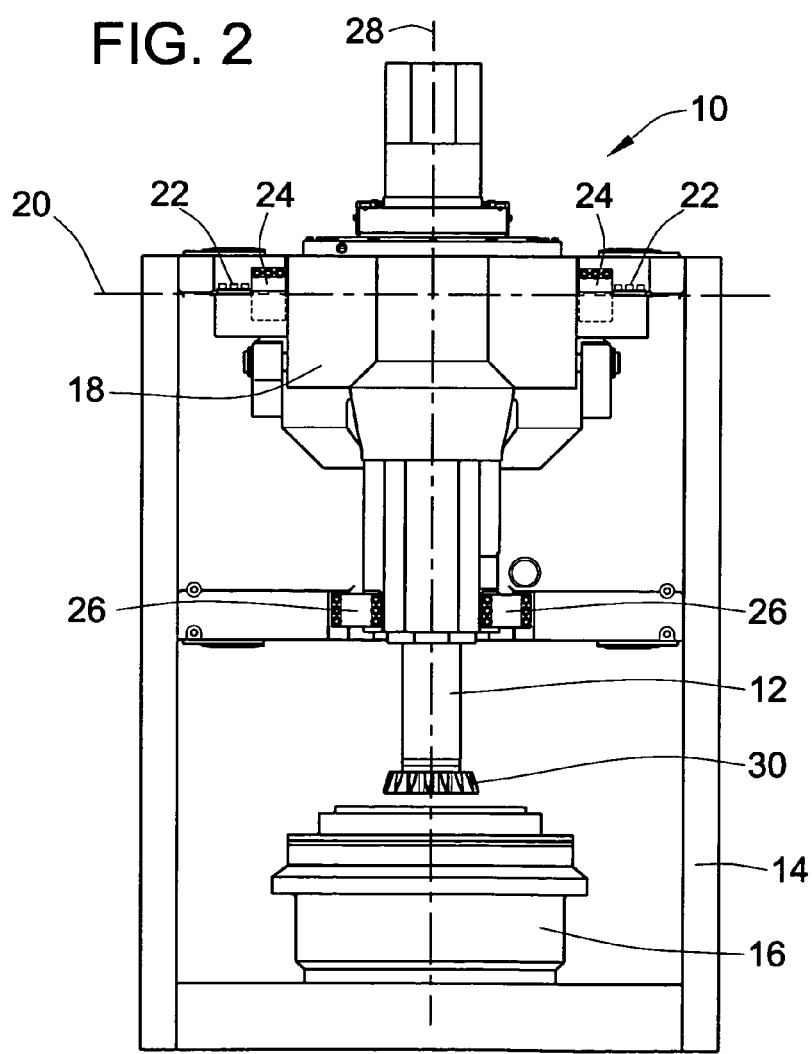
FIG. 2 is a front elevation outline view of the cutting machine shown in FIG. 1.
Figure 3:
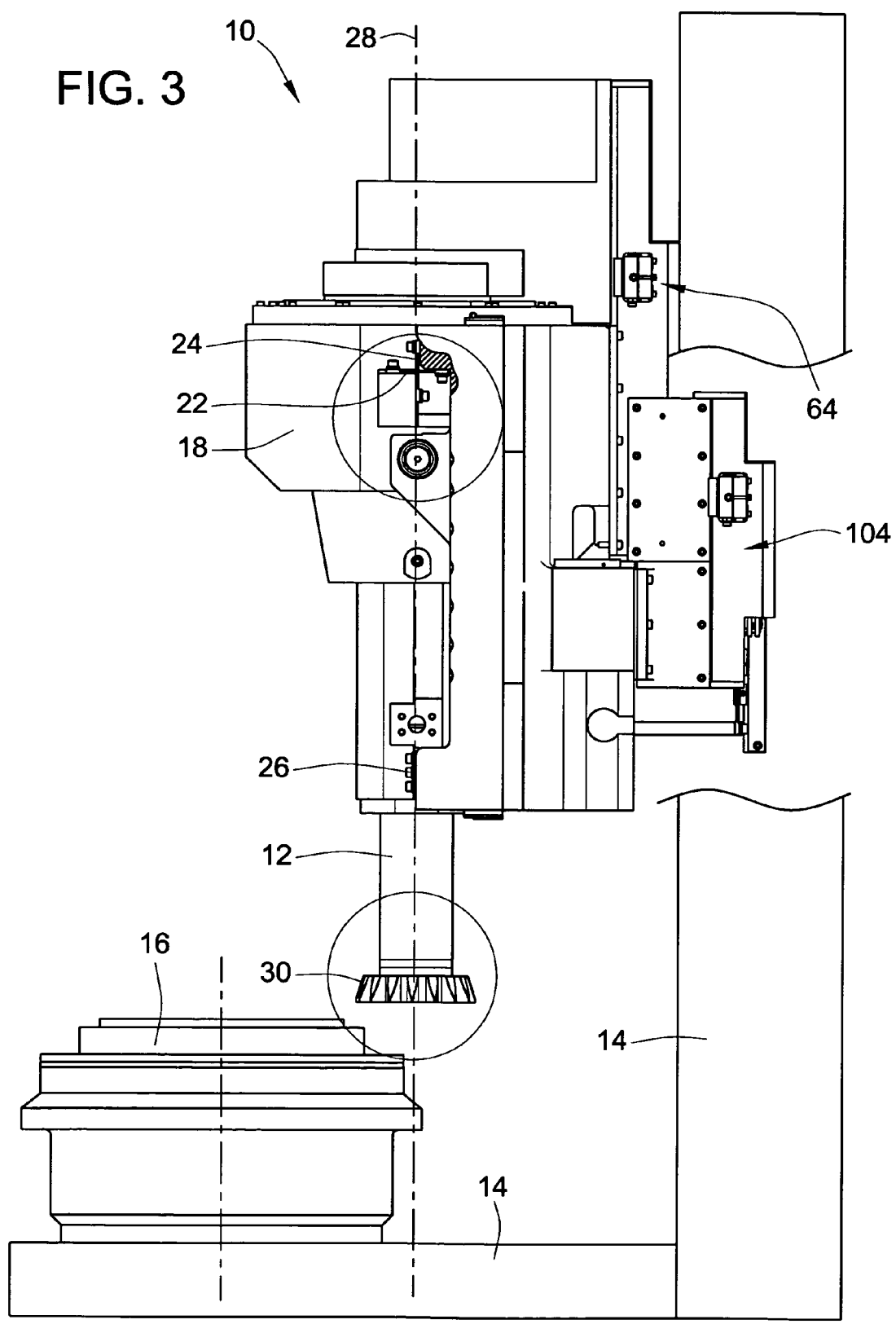
FIG. 3 is a right side elevation outline view of the hydraulic cutting machine shown in FIGS. 1 and 2.

FIGS. 1–3 illustrate in general outline a hydraulic cutting machine 10 which incorporates the various aspects and/or features of the invention relating to the construction, operation, and control of its vertically reciprocating spindle 12. The hydraulic cutting machine as shown is particularly suited for shaping gears. The hydraulic cutting machine includes a support frame 14 which may include several different portions including a support base, various upright vertical supports, various support bodies/plates, and the like. Support frame 14 generally provides a structure for supporting various different components of the cutting machine, providing a working area enclosure, and providing orientation and fixation for various different components of the hydraulic cutting machine 10.

A workpiece support table 16 is mounted to the support frame 14 and provides a support surface upon which a workpiece may be held for cutting operations effected by the spindle 12. The workpiece support table 16 may be rotated and can also be horizontally adjusted relative to the frame in order to provide a means for positioning the workpiece relative to the spindle 14. The spindle 12 is carried for linear reciprocation in a saddle 18, which may also be referred to as the spindle support housing. The saddle 18 is pivotably mounted to the support frame 14 for pivoting movement about a pivot axis 20 (shown best in FIG. 2). A gap 17 between the saddle 18 and support frame 14 permits such pivot movement. Although pivot stub shafts may be used to facilitate the pivoting movement, one subsidiary feature of the present invention is the use of flexure plates 22, 24 and 26 as shown in FIGS. 2, 3, 11 and 12 which provide for a limited pivoting range of movement of the saddle 18 relative to the support frame 14 through bending or flexure of the flexure plates.

To support the saddle 18 with the frame 14 each of the flexure plates 22, 24 and 26 has one end portion which is mounted to the saddle 18 and a second opposite end portion which is mounted to the support frame 14. To provide for the limited pivot joint and pivoting movement, the first two groups of flexure plates 22 and 24 are arranged along the pivot axis 20 with a given orientation that allows for a limited pivoting movement illustrated in FIGS. 10 and 11. One way to accomplish this is to have the first group of flexure plates 22 extend horizontally forward, and rearward; and to have the second group of flexure plates 24 extend vertically upward, and downward; with the two groups of flexure plates 22 and 24 intersecting the common pivot axis 20. For purposes of balance, and as shown in FIG. 2, preferably the flexure plates are provided on opposed lateral sides of the saddle 18 in order to support the saddle 18 and the spindle 12 centrally therebetween. The third group of flexure plates 26 are provided near the bottom of the saddle 18 and extend laterally as shown in FIG. 2. This third group of flexure plates 26 provides support for the saddle 18 and limits the pivoting movement of the saddle, thereby stabilizing and helping to establish a home position for the saddle 18 relative to the support frame 14.

Figure 4:
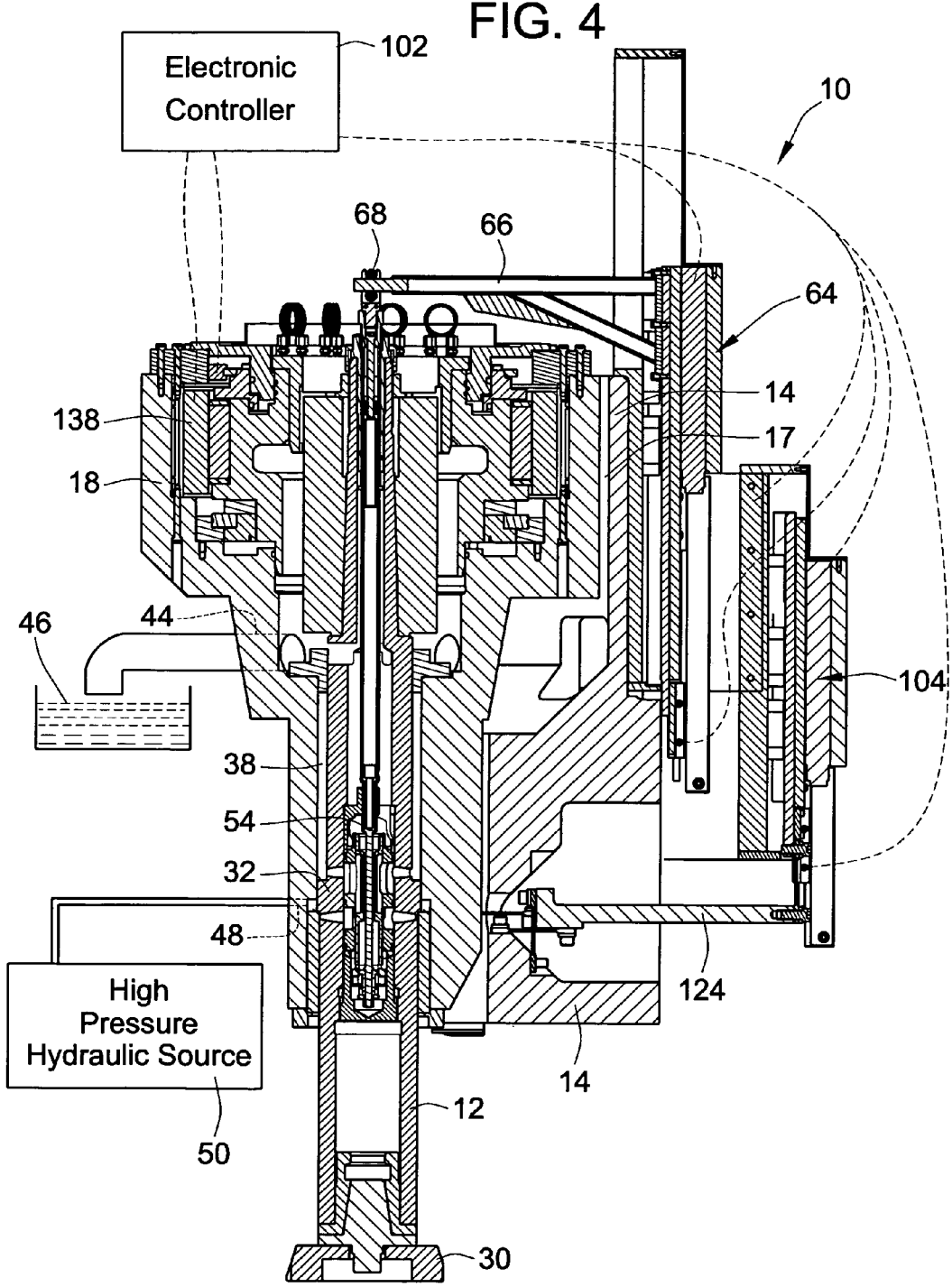
FIG. 4 is a cross section of the hydraulic cutting machine shown in FIG. 1 taken about line 4—4, with control aspects shown schematically.

As shown in FIG. 4, the spindle 12 extends along a vertical axis 28. The spindle 12 is slidably mounted to the saddle 18 such that the spindle 12 can be linearly reciprocated therein, and also rotated relative to the saddle 18. At the bottom end of the spindle 12, the spindle has a mounting end to which a cutting tool 30 can be removably mounted. The other top end of the spindle 12 is disposed near the top end of the saddle 18 such that the spindle is generally elongated in shape.

The spindle 12 is generally annular in shape and includes several stepped cylindrical and/or conical regions as is indicated in the drawings. As shown, for example, in FIGS. 6 and 4, a differential piston is integral (e.g. either unitarily formed as shown or alternatively a separate member mounted to the spindle) to provide for hydraulic actuation of the spindle 12. The differential piston 32 includes two piston faces including an upper annular piston face 34 that is of a larger working area than a lower annular piston face 36.

Figure 6:
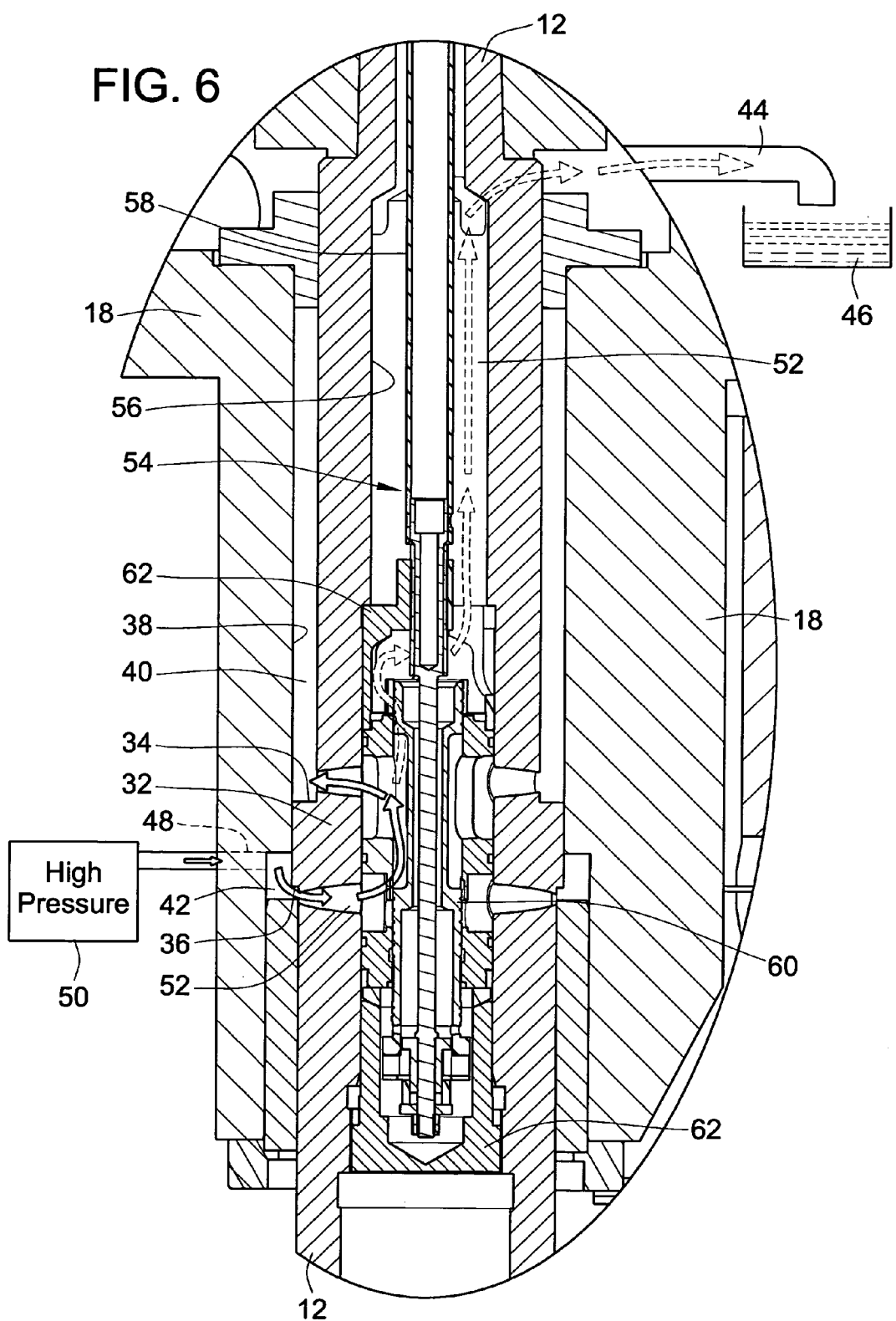
FIG. 6 is an enlarged view of a portion of the spindle and a portion of the valve to better show details of the hydraulic actuation system for hydraulically actuating the spindle with solid arrows indicating hydraulic flow according to one operational mode and dashed arrows indicating hydraulic flow according to a second operational mode (e.g. when the valve is translated upward).
Figure 7:
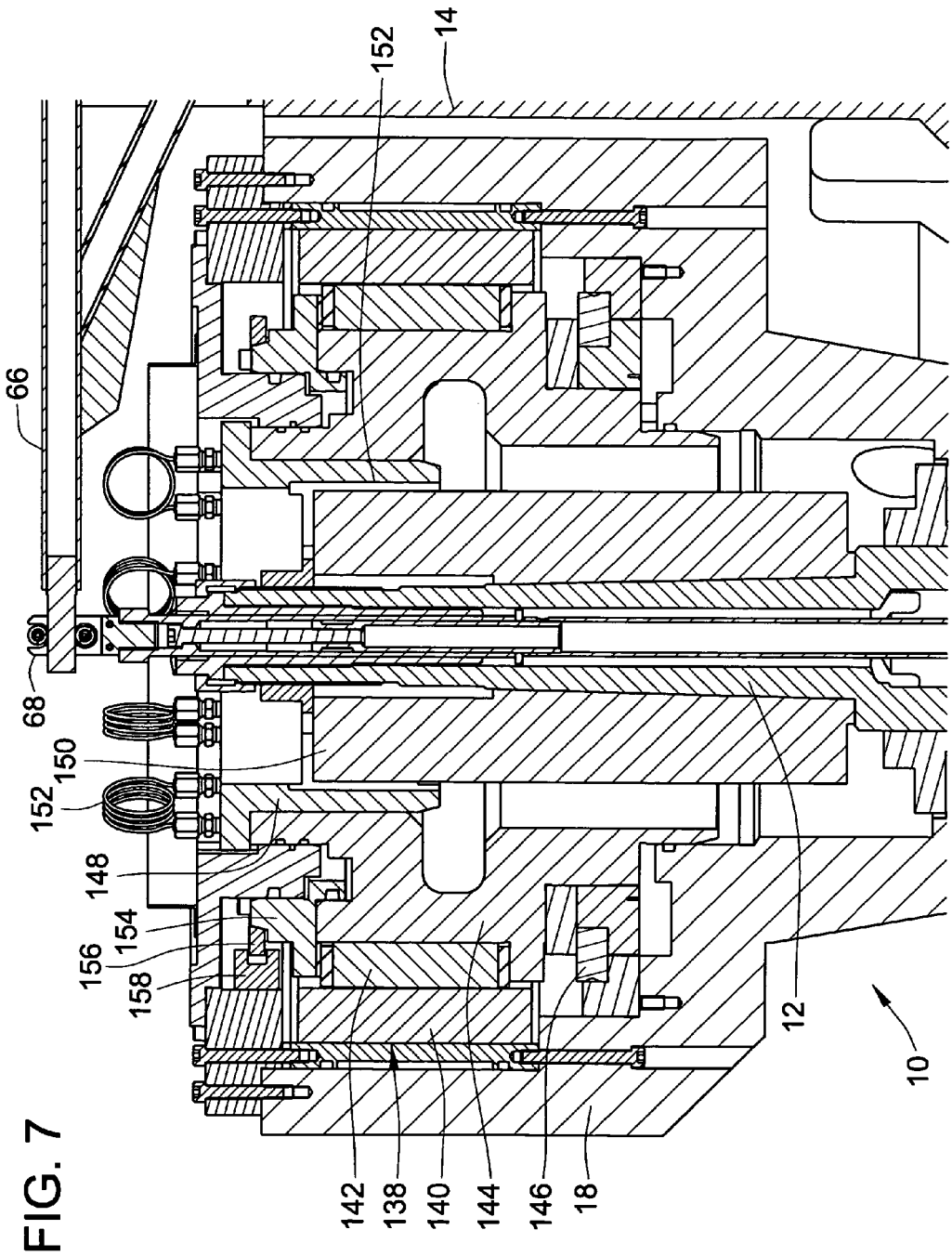
FIG. 7 is an enlarged view of an upper portion of the cross section of FIG. 4 to better show the integral motor of the saddle which is operatively connected to the spindle for rotating the spindle.

Referring to FIG. 6, the differential piston 32 is slidably mounted in a hydraulic cylinder 38 that is integrally connected (e.g. which may be in whole or in part unitarily formed with the saddle or an entirely separate component attached or mounted to the saddle) to the saddle 18. The differential piston 32 is slidably mounted within the hydraulic cylinder 38 and thereby forms upper and lower piston chambers 40, 42 to which working hydraulic fluid is directed. The upper hydraulic chamber is connected to an outlet port 44 which is connected to an ambient pressure hydraulic sump or reservoir 46 while the lower piston chamber 42 is connected to an inlet port which is connected to a hydraulic pressure source 50 that is of a higher hydraulic pressure than the sump or reservoir 46. The hydraulic pressure source 50 provides the hydraulic actuation force necessary to drive and linearly reciprocate the spindle 12 within the saddle 18. A hydraulic flow passageway 52 is defined through the saddle and components contained therein which passes from the inlet port 48 to each of the upper and lower piston chambers 40, 42 into the outlet port 44. It should be noted that the hydraulic flow passageway 52 while being fluidically connected to each of the inlet port 48, the outlet port 44 and the piston chambers 40 and 42, there is not continuous flow all the way through the hydraulic flow passageway and various portions of the hydraulic flow passageway 52 can and are in fact, blocked by the valve member 54 at various valve positions. Thus, it will be understood that the term hydraulic flow passageway 52 generally relates to areas in which fluid may be permitted to flow, which is dependent upon the position of a valve member. For example, as shown in FIG. 6, hydraulic flow according to two different modes or valve positions are indicated by solid and dashed lines, respectively.

To control fluid flow along the hydraulic flow passageway 52, a valve member 54 is provided. The valve member 54 is received through a cylindrical stepped bore 56 formed through the central region of the spindle 12. The valve member includes a valve stem 58 that projects through a top side of the spindle 12 and a lower flow regulating valve spool 60 that is contained in a valve cage assembly 60. The valve cage assembly 60 is mounted and trapped in a central or lower region of the bore 56 of the spindle 12. The valve member 54 is linearly slidable within the spindle 12 and regulates hydraulic fluid flow along and through the hydraulic flow passageway 52 in an operative manner in order to alternatively pressurize and depressurize the upper piston chamber 40 in a manner generally discussed in U.S. Pat. No. 4,125,056 to Tlaker et al. Generally, when the high pressure hydraulic fluid is communicated to the upper and larger piston face 34, the generated force will overcome hydraulic pressure exerted on the lower piston face 36 to drive the spindle downwardly in the cutting stroke. When the high pressure source is restricted and blocked from the upper piston face, and instead vented to the sump/reservoir 46, hydraulic pressure acting upon the lower piston face 36 will drive the spindle 12 upwardly thereby providing for the return stroke of the cutting tool.

While the hydraulic operation of the spindle 12 is much like or can be identical to that disclosed in the aforementioned Tlaker et al. patent, an entirely new way of controlling and actuating the valve member 54 is disclosed in accordance with one aspect of the present invention. In particular, and referring to FIGS. 4–5, an electrical linear actuator in the preferred form of a magnetic drive linear motor 64 is directly coupled to the valve member 54 for linearly stroking the valve member 54 in direct relation. The linear motor 64 can do so without the need for complex spring housings, cam mechanisms and linkages as has been done in the prior art through mechanical cam motion. The linear motor 64 is supported by and mounted to the support frame 14 and extends vertically along an axis that is parallel to the vertical axis of the valve member 54. The output of the linear motor 64 is coupled to the valve member 54 through a stroke motor link arm 66, which is rigidly mounted to the linear motor 64. The other end of the link arm 64 is slidably inserted into a linear translation joint 68 (or connected via a flexure) which is mounted to a top end of the valve stem 58 to allow for limited horizontal and pivoting movement therebetween to accommodate the pivoting movement of the saddle 18, while not losing the precision and accuracy of the linear stroking movement of the valve member 54.

Figure 5:
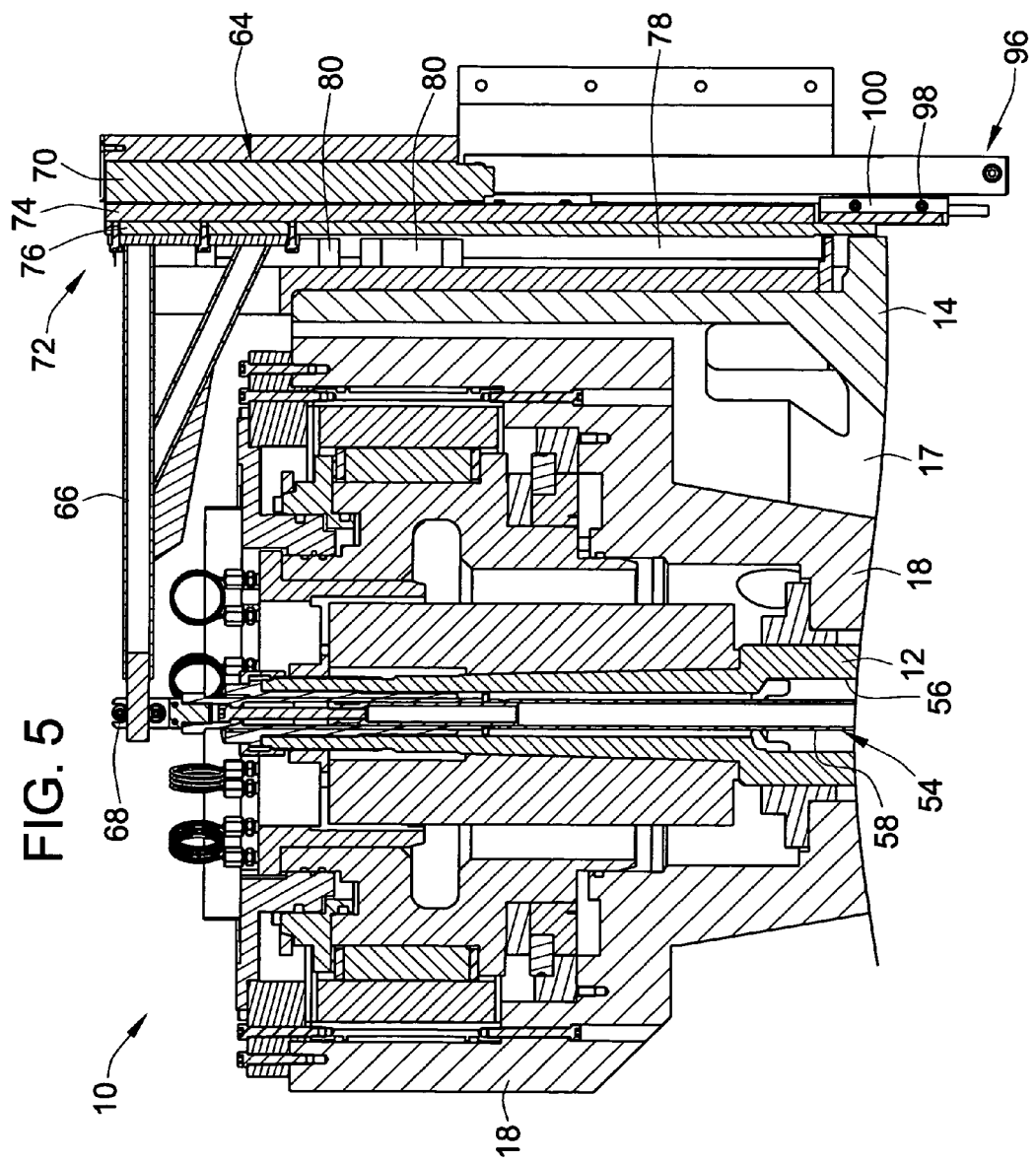
FIG. 5 is an enlarged view of an upper portion of FIG. 4 to better illustrate the linear motor and linear bearing system for stroking the control valve of the hydraulic cutting machine.

Referring in greater detail to the linear motor 64, reference can be had to FIG. 5. As shown in FIG. 5, the linear motor includes a linear motor coil 70 which is mounted to the support frame 14 and fixed relative thereto. The linear motor 64 also includes a linear motor magnet carriage 72 which is linearly moveable relative to the motor coil 70. The motor carriage includes a linear motor magnet plate 74 and a linear slide plate 76. To guide the linear sliding movement of the motor carriage 72, a linear bearing system is provided which includes two parallel linear bearing rails 78 mounted to the slide plate 76 of the carriage 72 and linear bearing blocks 80 that are securely mounted to the support frame 14. As shown in the attached drawing, the motor carriage 72 is moveable between the linear motor coil 70 and the linear bearing blocks 80. Although the linear bearing rails are shown mounted to the carriage and the linear bearing blocks mounted to the frame, the reverse may be done such that the rails would be mounted to the frame and the bearing blocks mounted to the carriage. Similarly, the linear motor magnet carriage could also be mounted stationary to the frame with the linear motor coil being moveable and mounted to the link arm 66 to drive the valve.

Figure 14:
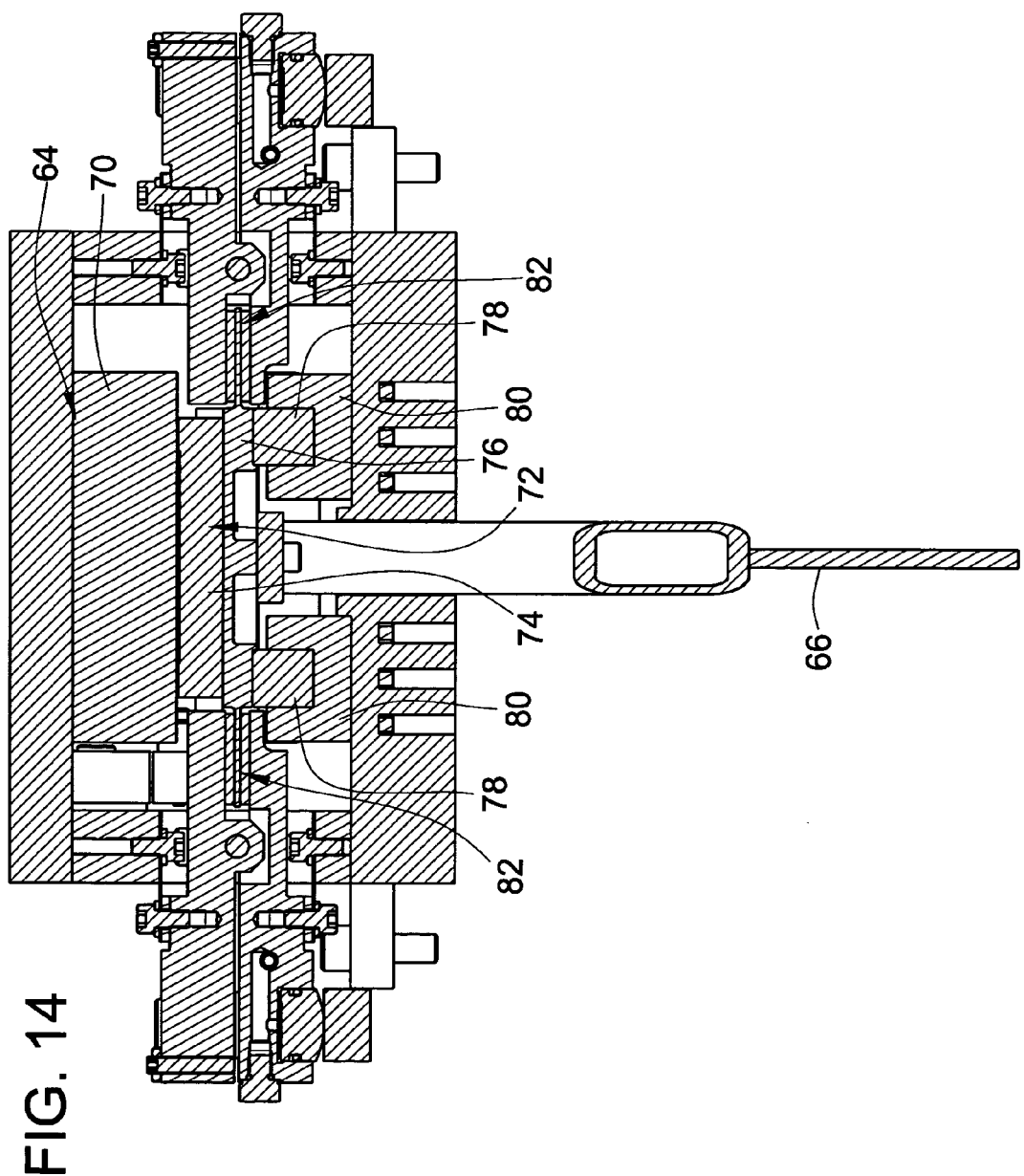
FIG. 14 is a cross section of the linear motor assembly of FIG. 13 taken horizontally through the linear motor assembly.
Figure 15:
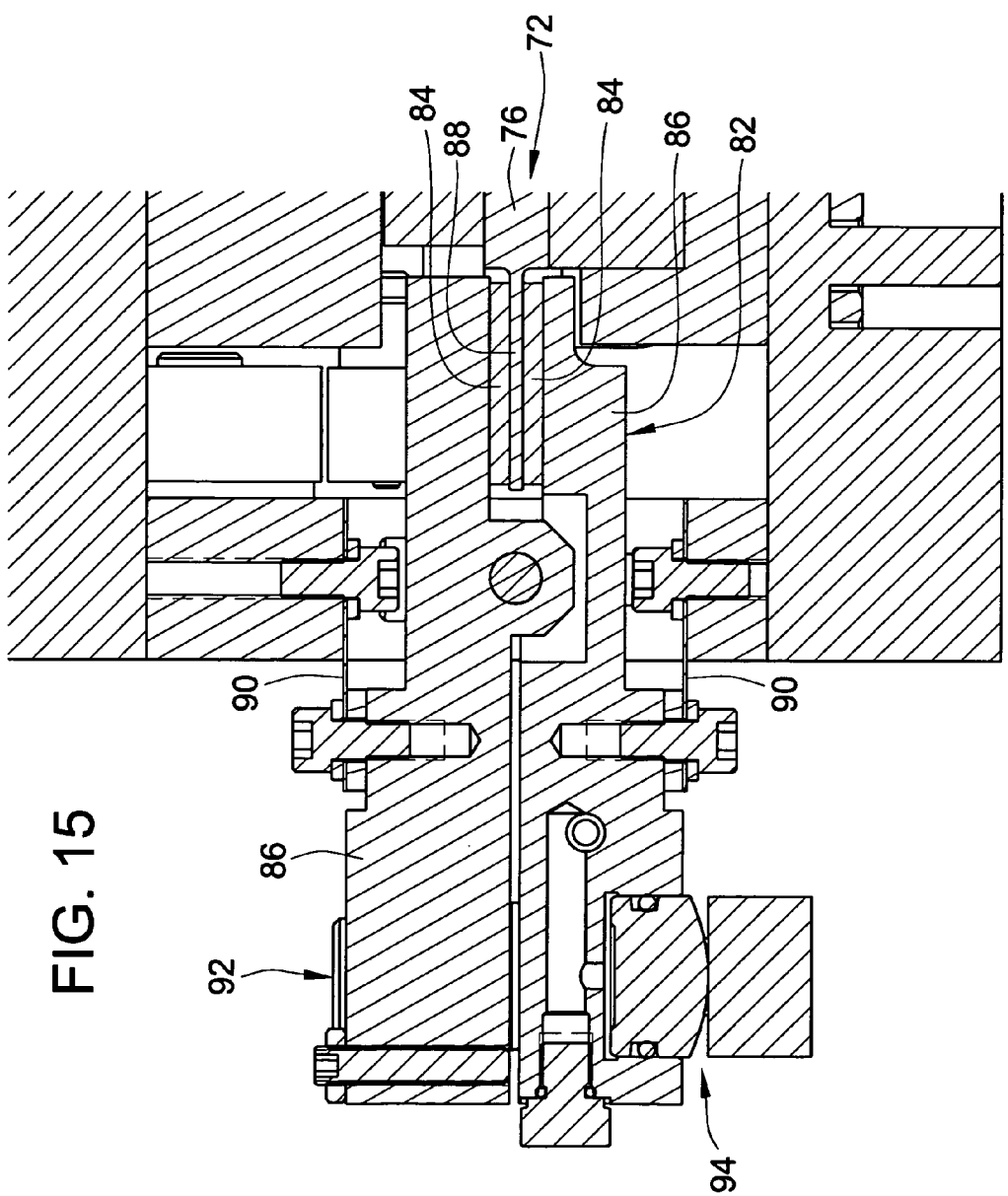
FIG. 15 is an enlarged view of a portion of FIG. 14 to better show the braking mechanism used for the linear motor assembly. It will be understood that the same braking mechanism and same cross section as shown in FIGS. 14 and 15 may be equally applicable and would similarly depict the other linear motor assembly used to drive the back off lever.

Further associated with the linear motor 64 is a braking means which comprises a brake that acts between the linear motor coil 70 and the linear motor magnet plate carriage 72. The brake is better shown in greater detail in FIGS. 14 and 15 which illustrate an enlarged horizontal cross-sectional view of the linear motor 64 and its related assembly components. As shown therein, the brake includes brake pads 84 which are carried on brake calipers 86 which are moveable relative to one another. The calipers 86 are movable toward and away from each other to selectively engage and brake against a fin 88 that extends from the linear slide plate 76. Thin flexure mounting plates 90 are used to mount the brake calipers 86 to the support frame 14 and a twin spring pack brake clamping mechanism 92 and a hydraulic piston brake release 94 are provided for operating the brake 82. The brake 82 is automatically engaged to brake and stop the motor carriage 72 relative to the linear motor coil 70 when there is no electrical power to prevent the linear motor magnet plate carriage 72 from simply dropping down out of position. As shown in FIG. 14, opposed pairs of brakes 82 act on opposed sides of the assemblage associated with the linear motor 64 for balance purposes.

The linear motor 64 is further associated with a linear encoder system 96 which comprises a linear scale 98 and a reader head 100. As shown, the reader head 100 is mounted to the motor carriage 72 while the linear scale 98 is mounted to a plate extending from the linear motor coil and/or the frame 14. In operation, as the motor carriage 72 moves, the reader head 100 will move therewith and read the linear scale 98 which is fixed relative to the linear motor coil 70 and support frame 14. The reader head 100 then provides position feedback indicating the precise linear position of the motor carriage 72 and thereby the valve member 54 which is coupled to the motor carriage 72. Of course, the components of the encoder system 96 can be reversed such that the linear scale 98 can alternatively be mounted to the motor carriage 72 (either directly or indirectly through an additional assembly or through the linear bearing rail) and the reader head can alternately be mounted in a fixed position to the support frame 14 either directly or indirectly through the linear motor coil housing.

The encoder system 96 and more specifically the reader head 100 is in communication with an electronic controller 102 (e.g. a microprocessor, programmable logic device, computer numerical controller system, or other similar types of controllers) as shown in FIG. 4. The controller 102 is operative to use the position feedback for closed loop control over the linear motor 64. The controller 102 can thus controllably position the valve member 54 as desired and thereby control the resulting hydraulic actuation movement and position of the spindle 12. The stroking of the valve member 54 can be done by the controller 102 according to the same general movement and timing principles outlined in Tlaker et al., U.S. Pat. No. 4,125,056, but instead of doing it through mechanical motion, the motion can be done electronically. An advantage of this is that the adjustment can be done electronically. Also more control over the relative speed stroking length and movement of the valve and thereby the spindle can be accomplished electronically as opposed to mechanical cam action.

Turning towards another aspect of the present invention, the cutting machine 10 includes a novel actuation system for controllably pivoting the saddle 18 relative to the support frame 14 about the pivot axis 20. The components of the actuation system and the operation thereof are best shown with reference to FIGS. 8–11. As shown therein, the pivoting system includes a linear electrical actuator in the form of a linear motor 104. The linear motor 104 is in many respects similar to the linear motor 64 and can include the same motor and braking mechanism discussed above and as shown in FIGS. 14–15. As shown, the linear motor 104 is mounted to the support frame 14 by being carried on the back of the stationary motor coil housing for the first linear motor 64 discussed previously.

The linear motor 104 includes a linear motor coil 106 that is mounted to the frame 14 and a motor carriage 108 that is linearly slidable relative to the linear motor coil 106. The linear motor magnet carriage 108 includes a linear motor magnet plate 110 mounted to a linear slide plate 112. A linear bearing system is also provided for guiding the linear reciprocation of the linear motor. The bearing system includes linear bearing blocks 114 mounted to the support frame 14 and linear bearing rails 116 mounted to the linear motor carriage 108. The blocks 114 and rails 116 slidably engage each other to guide linear movement. These may be oriented vertically as shown or can alternatively take a different orientation if desired. Additionally, the linear bearing rails may be mounted stationary to the frame and the linear bearing blocks could be mounted to the motor carriage as an alternative. Similarly, the linear motor coil could also be mounted for movement with the motor magnet carriage being mounted stationary to the support frame.

To provide for closed loop control over the linear motor 104, an encoder system 118 is provided which includes a reader head 120 and scale 122 which is positioned in association with the reader head 120 to be read thereby. The reader head 120 is either mounted to the stationary component or the moving component and the scale is mounted to the other component. As shown herein, the reader head 120 is mounted to the linear motor magnet carriage 108 while the scale 122 is shown mounted to the linear motor coil 106. In operation, movement of the motor carriage 108 causes the reader head 120 to move therewith. Such movement and the position of the motor carriage 108 is therefore read by the reader head 120 which is operative communication with the encoder scale 122. Feedback is provided to the electronic controller 102 (see FIG. 4) which provides for closed loop control over the linear motor 104.

The linear motor 104 acts upon the saddle 18 through a back off lever 124. The back off lever 124 is pivotably connected to the support frame 14. To provide for this pivot connection, cooperating flexure plates may be used including vertical flexure plates 126 having opposed ends mounted to the back off lever 124 and support frame 14, respectively, and horizontal flexure plates 128 having opposed ends mounted to the back off lever 124 and the support frame 14, respectively. The flexure plates 126, 128 intersect along a common pivot axis 130 over which the back off lever 124 can pivot relative to the support frame 14. The back off lever 124 is driven by the linear motor 104. As shown, a flexure plate 132 connects the linear motor magnet carriage 108 to an end portion of the back off lever 124. This flexure plate 132 accommodates the linear motion facilitated by the linear motor while also allowing for the slight arc created when the back off lever is pivoted about the pivot axis 130.

Figure 8:
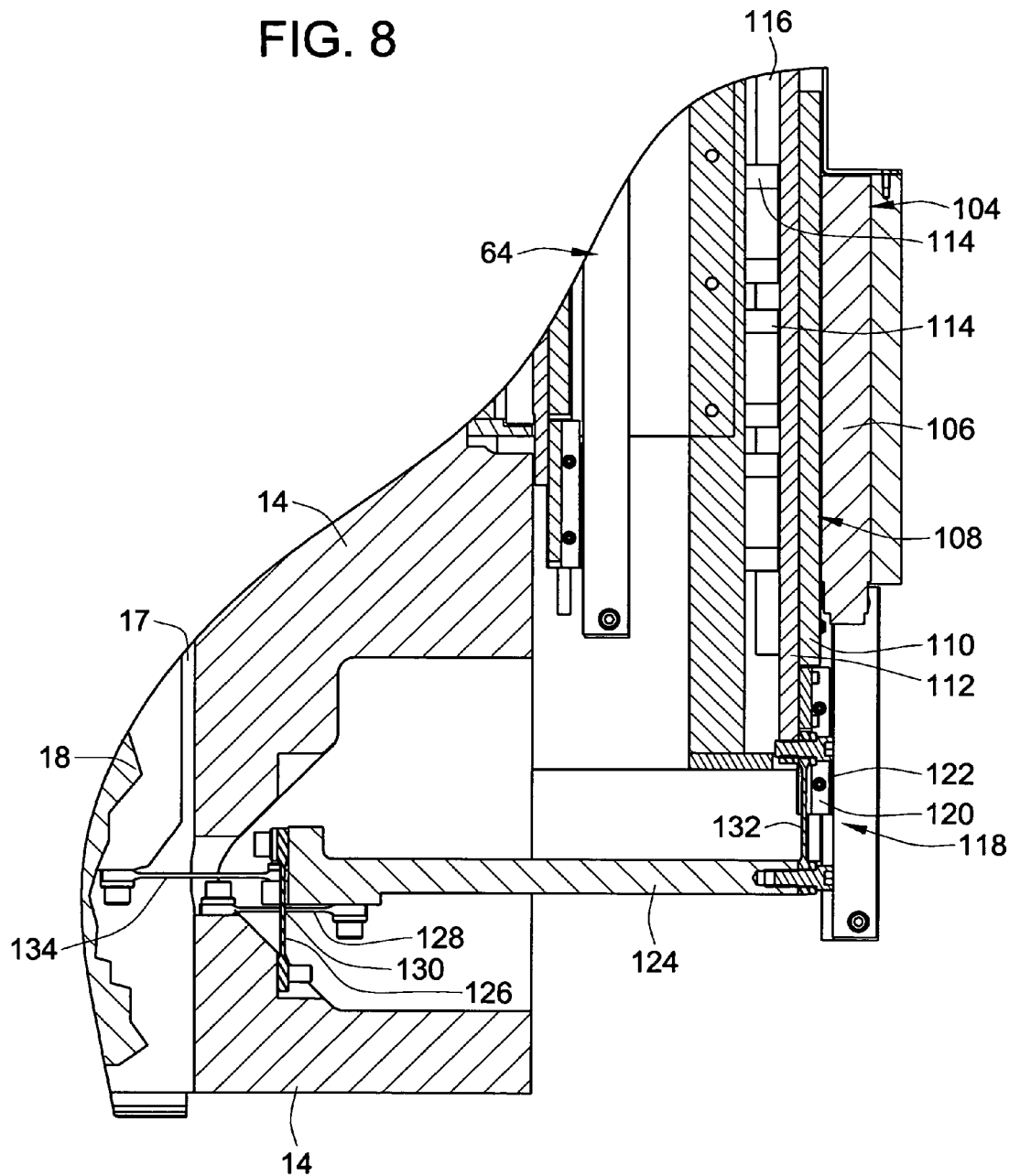
FIG. 8 is an enlarged view of a bottom portion of the cross section of FIG. 4 to better illustrate the linear motor, linear bearing, and back off lever actuation system for pushing and pulling the saddle to pivot the saddle about its axis.
Figure 9:
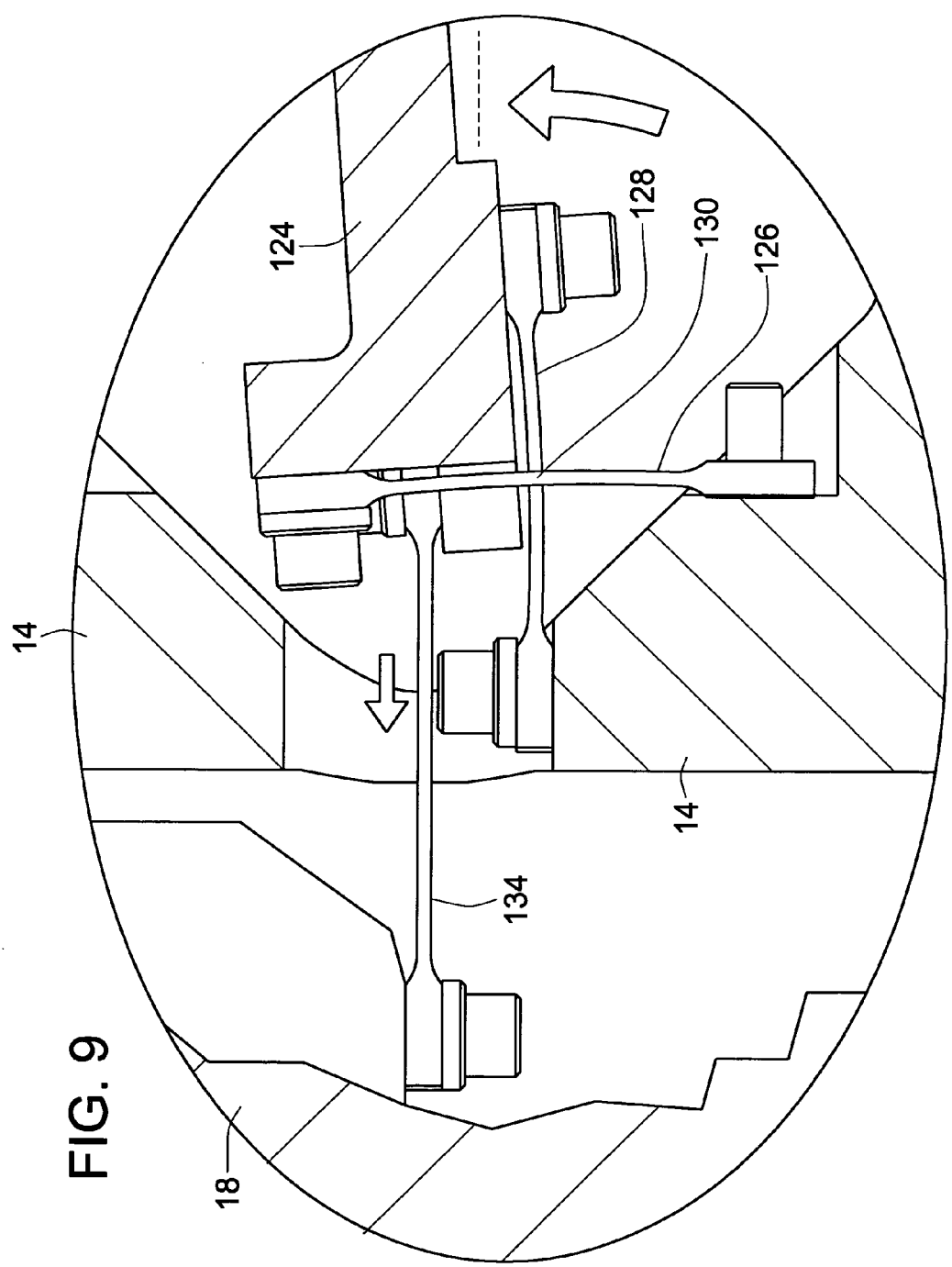
FIGS. 9 and 10 are enlarged views of a portion of FIG. 8 showing different pulling and pushing actuation modes for the back off lever which has been driven by the linear motor as shown in FIG. 7.
Figure 10:
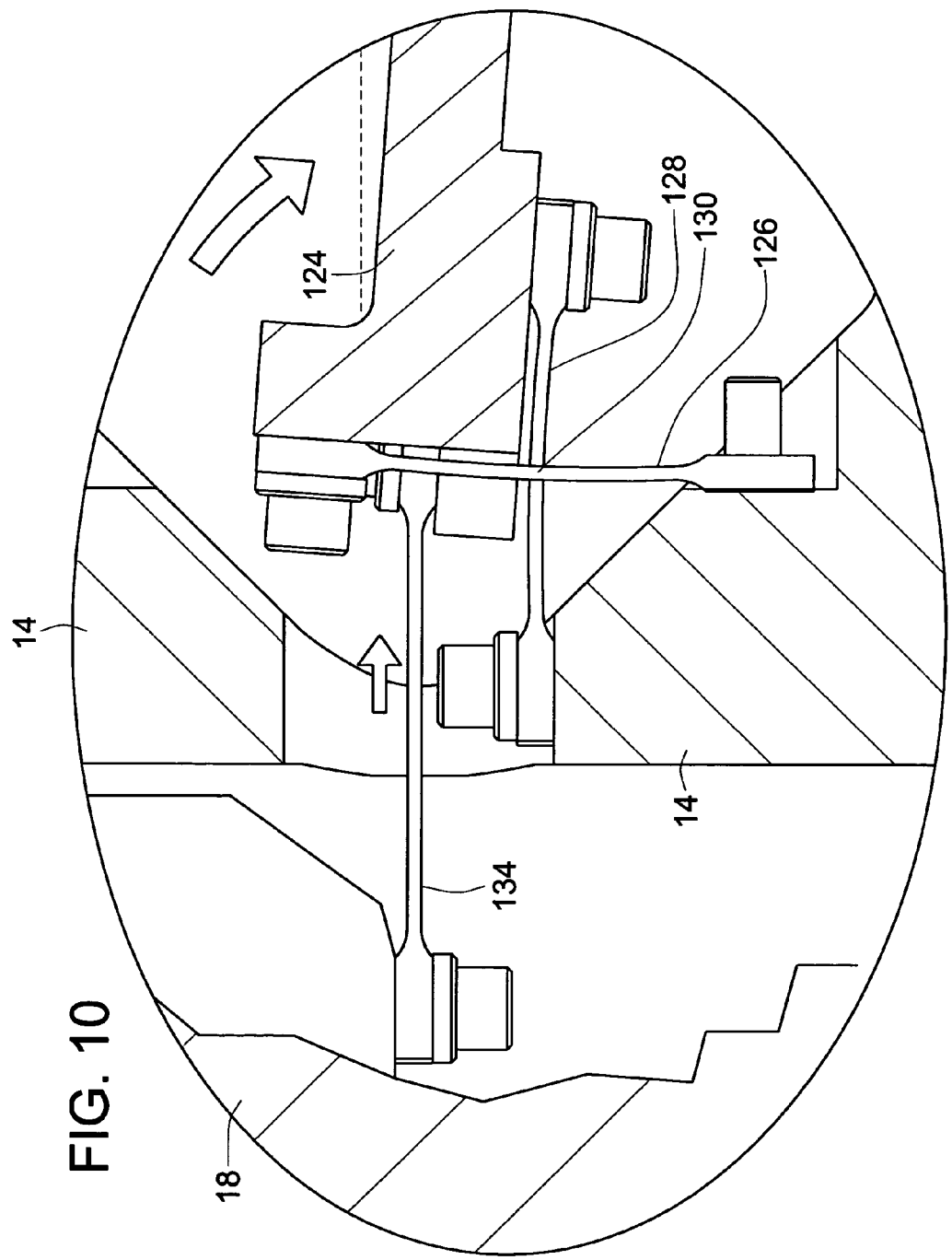
Figure 11:
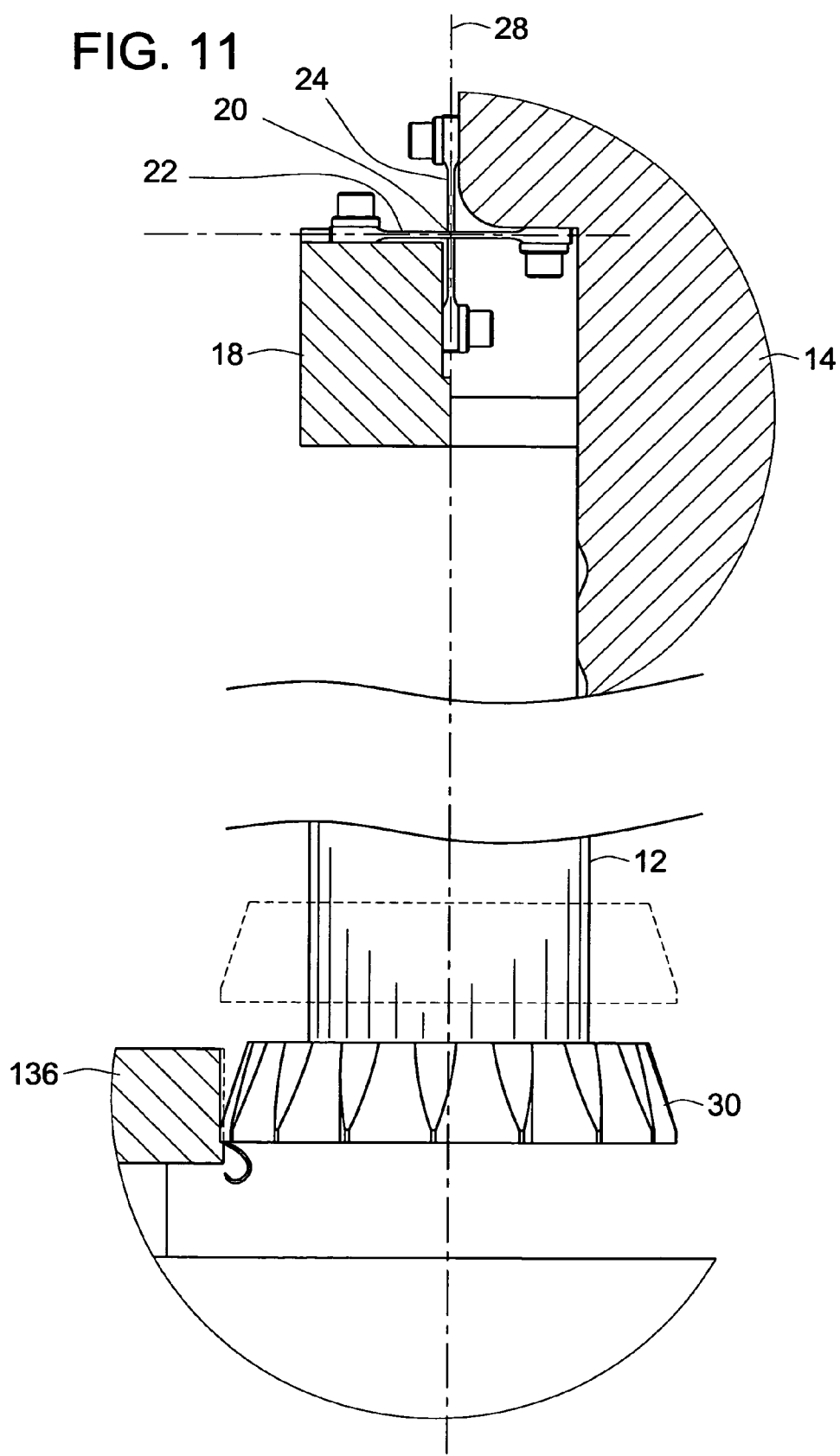
FIGS. 11 and 12 are enlarged views of different portions of the hydraulic cutting machine shown in FIG. 3 (break lines indicated) showing the end of the cutting tool and the upper pivot connection between the saddle and the support frame, with FIG. 11 showing the orientation during the cutting down stroke, and FIG. 12 showing the orientation during the return stroke.
Figure 12:
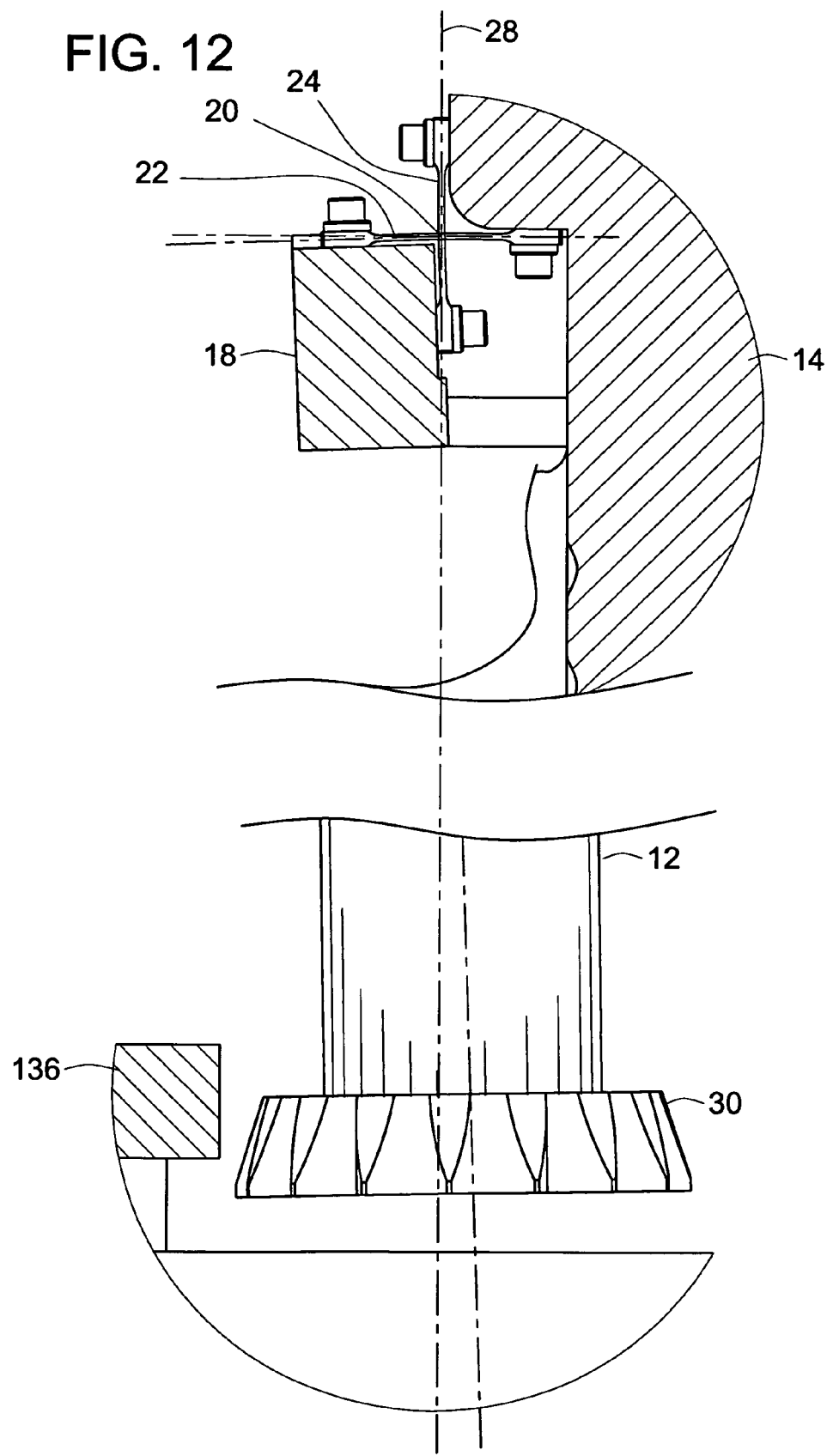
Figure 13:
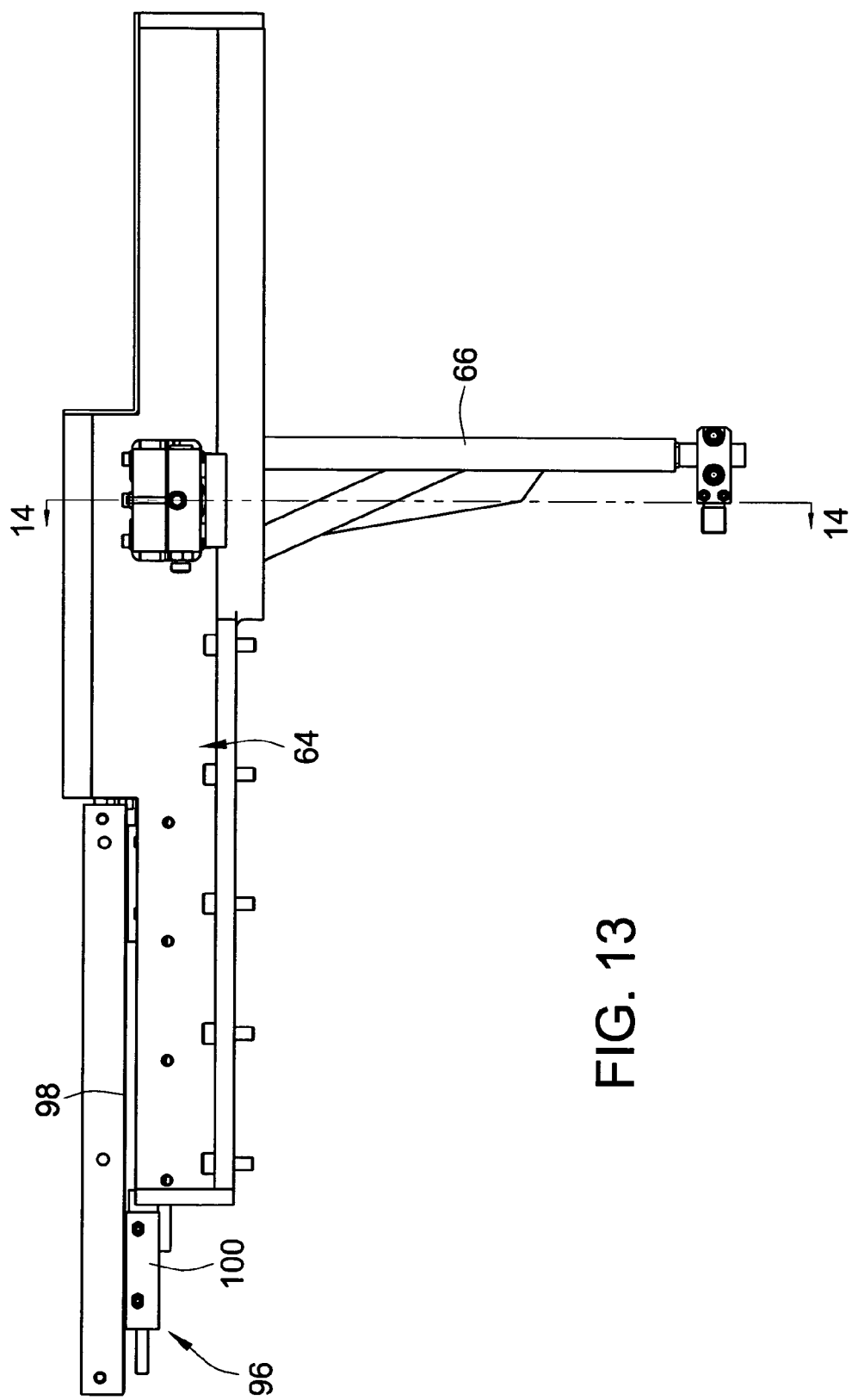
FIG. 13 is a profile view of the linear motor assembly used for linearly stroking the valve.

When the linear motor magnet carriage is reciprocated, this movement pivots the back off lever 124 about the pivot axis 130 which in turn pushes and pulls the saddle 18 as shown schematically in FIGS. 9 and 10 to pivot the saddle 18 about its pivot axis 20 as shown for example in FIGS. 11–12. To provide for the pushing and pulling action through the back off lever 124, further flexure plates 134 are provided which have one end mounted to the back off lever 124 at a point offset from the pivot axis 130 and a second portion mounted to the saddle 18. These flexure plates 134 accommodate the slight arc created by virtue of the pivoting action about pivot axis 130 while maintaining proper spacing between the back off lever 124 and the saddle 18. As shown in FIGS. 8–10, the linear motor 104 and back off lever 124 are used to control the relative position of the spindle 12 and cutting tool 30 relative to a workpiece 136. During the downward cutting stroke as shown in FIG. 11, the spindle 12 and cutting tool 30 may be kept truly vertical along the vertical axis 28. Also any profile can be generated normal to the gear tooth profile. After the cutting stroke is finished, it is desirable to relieve the cutting tool from the workpiece 136 as shown in FIG. 12. Accordingly the linear motor 104 is actuated to slightly pivot the saddle and thereby move the spindle 12 and cutting tool 30 away from the workpiece 136. This allows the spindle and cutting tool to retract without engaging the workpiece thereby extending cutting tool life.

An additional benefit of the linear motor 104 is that it can be actuated during the downward cutting stroke to effect crowning of a workpiece. According to this operation, as the cutting tool is being moved and driven downwardly against the workpiece, the linear motor 104 is controllably driven to round the top of the workpiece or "crown" the gear in the case of a gear shaping machine. The cutting tool is thus driven horizontally inward and/or outward relative to the rotational axis of the gear during the vertically downward cutting stroke. Heretofore, this has not previously been possible with such a gear shaping machine of this type. The electronic controller 102 thus coordinates the linear motion of the spindle 12 with the pivoting motion of the saddle 18 (by controlling linear motors 64 and 104 simultaneously) to effect the desired shape or crowning action.

A further aspect of the present invention is the integration of a rotary electrical actuator 138 into the saddle 18 that controls and sets the relative angular position of the spindle 12 relative to the saddle 18. This rotary actuator 138 can also work in coordinated movement with the linear motors 104 and 64 (e.g. being simultaneously controlled by controller 102) to effectuate a spiral or helical cutting action (e.g. to shape spiral or helical shaped flutes into a gear workpiece 126), if desired.

The rotary actuator 138 includes an integral motor stator 140 which is mounted internally of the body of the saddle 18. An integral motor rotor 142 is mounted internally of the stator 140 and surrounds the spindle 12. The rotor 142 is carried for rotation by a guide bushing hub 144, which is rotatably mounted to the saddle 18 through a bearing ring 146. The guide bushing hub 144 also has mounted thereto a spindle guide housing 148 that is splined through keys to the spindle guide 150, which is secured to the spindle 12. By virtue of the spline keys 152, the spindle 12 can linearly reciprocate relative to the rotor 142 and spindle guide 150, but is rotatably coupled thereto and thus rotates when the rotary actuator 138 rotates.

To provide for closed loop control over the rotary actuator 138, a rotary encoder system is also provided which includes a rotary encoder ring 154 to which an encoder scale 156 is mounted and a reader head 158 which is mounted to the stator 140 or saddle 18. This encoder system provides feedback to the electronic controller 102 to indicate the angular position of the integral rotary actuator 138 and thereby provide for closed loop control such that the rotary actuator can accurately and precisely rotate the spindle 12 and thereby the cutting tool 30 during linear movement of the spindle 12 and the cutting tool 30 during the cutting stroke.

Figure 16:
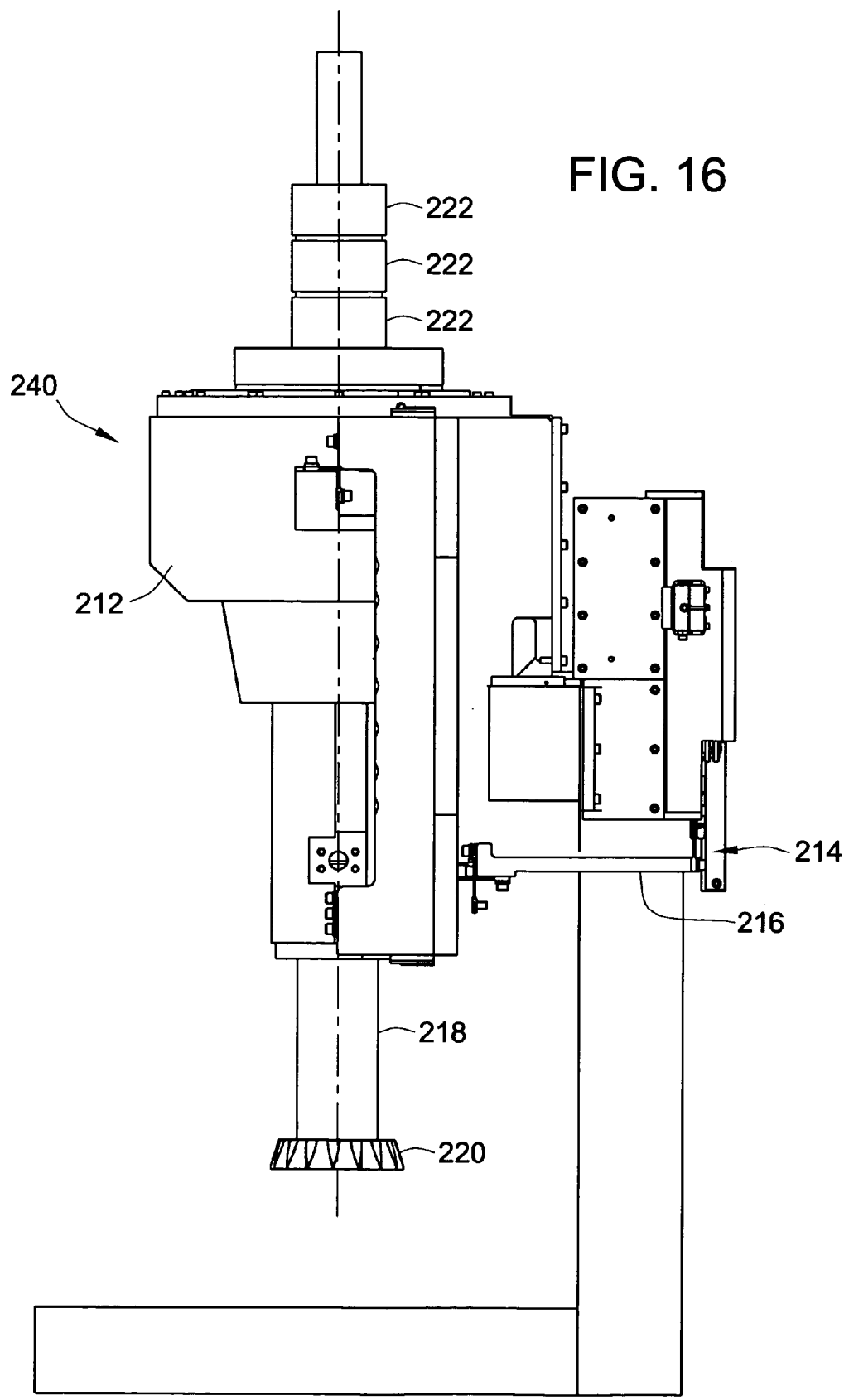
FIG. 16 is an alternative embodiment of the present invention showing a non-hydraulic cutting machine in which linear motors are stacked or otherwise provided in series to effectuate linear reciprocation of the spindle without hydraulic actuation thereof.

An alternative embodiment of a cutting machine is depicted in FIG. 16 which shows a non-hydraulic gear shaping machine 210. This machine similarly includes the integral rotary actuator on the saddle 212 and the linear motor system 214 which drives a back off lever to selectively pivot the saddle 212. However, the spindle 218 and cutting tool 220 are not hydraulically driven, but instead are directly driven through electrical actuation in the form of one or more linear motors 222 arranged in series and acting upon the spindle 218 directly. As shown, three linear motors 222 shown in series (e.g. either stacked or arranged at different angular orientations about the central axis) are preferably inline with the spindle 218 to directly drive the spindle 218. Multiple linear motors are typically needed to provide sufficient force in order to drive the spindle 218 directly as applied to gear shaping machines. Thus, it will be noted that this is a further additional aspect of the present invention.

It should also be noted that linear motors are not the only type of electrical actuators which may be used and that for micro-machining or where a very short movement may be desired that voice coil motors in place of linear motors may be used. Other appropriate electrical actuators that meet the requirements of a practical machine may also be used.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A hydraulic cutting machine for driving a cutting tool in relation to a workpiece, comprising:
    a support frame;
    a work table situated in relation to the support frame;
    a saddle supported by the support frame in relation to the work table;
    a spindle carried by the saddle for linear reciprocation, the spindle having an output end adapted for attachment to the cutting tool;
    a hydraulic cylinder integrally connected to the saddle;
    a piston slidably mounted in the hydraulic cylinder for linear reciprocation, the piston dividing the hydraulic cylinder into upper and lower chambers, the piston being connected to the spindle, the piston having opposed working faces of different working areas;
    a hydraulic passageway extending between an inlet port for connection to a hydraulic pressure source and an outlet port for connection to a hydraulic sump, the hydraulic passageway fluidically connected to the inlet port, the lower chamber, the upper chamber and the outlet port;
    a valve regulating hydraulic flow along the hydraulic passageway, the valve having a first state restricting hydraulic flow between the upper and lower chambers to hydraulically drive the piston and spindle in a first direction and a second state facilitating hydraulic flow between the upper and lower chambers to drive the piston and spindle in a second direction; and
    an electrical linear motor actuator acting upon the valve to control hydraulic actuation of the spindle.

2. The cutting machine of claim 1, wherein the electrical linear motor actuator is a first linear motor comprising a linear motor coil and a linear motor magnet carriage.

3. The cutting machine of claim 2, further comprising a linear slide mechanism including a linear bearing and a linear bearing rail, wherein a first portion of the linear slide mechanism is mounted to the linear motor magnet carriage and a second portion of the linear slide mechanism is mounted to the support frame, and wherein the linear slide mechanism guides linear reciprocating movement of the linear motor magnet carriage when the linear motor coil is activated.

4. The cutting machine of claim 3, further comprising braking means for braking the linear motor carriage relative to the linear motor coil.

5. The cutting machine of claim 2, further comprising a linear encoder comprising a reader and a linear scale, the reader and scale being operably mounted to different portions of the linear motor to provide position feedback indicating a linear position of the linear motor magnet carriage relative to the linear motor coil.

6. The cutting machine of claim 5, further comprising a controller having an electrical output coupled to the linear motor coil, the controller responsive to the linear encoder for closed loop control over the linear motor.

7. The cutting machine of claim 2, wherein the valve and the linear motor magnet carriage are vertically oriented for vertical stroking movement, and wherein the linear motor magnet carriage and the valve are arranged in horizontal spaced relation, further comprising a link arm rigidly mounted to the linear motor magnet carriage, the link arm extending horizontally and acting upon the valve.

8. The cutting machine of claim 7, wherein the link arm includes an end portion projecting horizontally through a top end of the valve, the end portion being horizontally slidably mounted in the top end of the valve.

9. The cutting machine of claim 2, wherein the electrical actuator is securely mounted to the frame, and wherein the saddle is pivotably mounted to the support frame, further comprising means for pivoting the saddle relative to the support frame about a pivot location.

10. The cutting machine of claim 9, wherein the pivoting means includes a second linear motor acting upon the saddle at a location offset from the pivot location, further comprising a controller controlling the first and second linear motors, the controller having a crowning mode wherein the controller drives the first and second linear motors simultaneously to drive the spindle linearly and radially inwardly and outwardly relative to a vertical axis.

11. The cutting machine of claim 10, wherein the second linear motor is mounted to the first said linear motor along a backside thereof.

12. The cutting machine of claim 10, further comprising a rotary electrical actuator mounted to the saddle and surrounding the spindle, the rotary electrical actuator having a stator mounted to the saddle and a rotor rotatable relative to the stator, the rotor being coupled to a spindle guide bushing, the spindle guide being coupled to a spindle guide, the spindle guide being rotatably coupled and linearly slidable within the spindle guide bushing, whereby the rotary electrical actuator is operable to rotate the spindle as the spindle strokes linearly.

13. The cutting machine of claim 1, wherein the electrical actuator comprises a stator and a carriage, the carriage being linearly reciprocable relative to the stator and acting directly upon the valve, wherein the valve and the carriage move upwardly in unison and downwardly in unison.

14. A cutting machine for driving a cutting tool in relation to a workpiece, comprising:
    a support frame;
    a work table situated in relation to the support frame;
    a saddle pivotably mounted to the support frame via a pivot connection in relation to the work table, the pivot connection comprising a plurality of flexure plates;
    a spindle carried by the saddle for linear reciprocation, the spindle having an output end for attachment to the cutting tool;
    means for linearly reciprocating the spindle;
    a linear electrical actuator acting between the saddle and the support frame at a location offset from the pivot connection to pivot the saddle a limited range relative to the support frame.

15. The hydraulic cutting machine of claim 14, wherein each flexure plate has one mounting portion coupled to the frame and a second mounting portion coupled to the saddle, the flexure plates including two groups being oriented in different planes that share a common axis to form a limited pivot joint.

16. The hydraulic cutting machine of claim 15 wherein a first group of the flexure plates extends horizontally forward and rearward between mounting portions and a second group of the flexure plates extends vertically between mounting portions, each of the first and second groups of flexure plates including flexure plates on opposed lateral sides of the spindle along the common axis to support the saddle laterally therebetween.

17. The hydraulic cutting machine of claim 16, further comprising a third group of the flexure plates vertically below the first and second groups, the third group of flexure plates disposed in a vertical plane and extending laterally between the saddle and the frame.

18. The cutting machine of claim 14, wherein the linear electrical actuator is a linear motor comprising a linear motor coil and a linear motor magnet carriage.

19. The cutting machine of claim 18, further comprising a linear slide mechanism including a linear bearing and a linear bearing rail, wherein a first portion of the linear slide mechanism is mounted to the linear motor magnet carriage and a second portion of the linear slide mechanism is mounted to the support frame, and wherein the linear slide mechanism guides linear reciprocating movement of the linear motor magnet carriage when the linear motor coil is activated.

20. The cutting machine of claim 18, further comprising a linear encoder comprising a reader and a linear scale, the reader and scale being operably connected to different portions of the linear motor to provide position feedback indicating a linear position of the linear motor magnet carriage relative to the linear motor coil.

21. The cutting machine of claim 20, further comprising a controller having an electrical output coupled to the linear motor coil, the controller responsive to the linear encoder for closed loop control over the linear motor.

22. The cutting machine of claim 14, further comprising a back off lever pivotably mounted to the support frame, the back off lever being connected to the linear electrical actuator through a first flexure plate, and the back off lever being connected to the saddle through a second flexure plate, wherein actuation of the linear electrical actuator pivots the back off lever to push and pull the saddle through the second flexure plate and thereby pivot the saddle about the pivot connection.

23. The cutting machine of claim 22, further comprising third and fourth flexure plates oriented in different planes that share a common axis to form a limited pivot joint, the third and fourth flexure plates having a first portion mounted to the frame and a second portion mounted to the back off lever.

24. The cutting machine of claim 14, further comprising means including a rotary electrical actuator integral with and carried in the saddle rotatably coupled to the spindle for rotating the spindle relative to the saddle and allowing linear reciprocation of the spindle relative to rotary electrical actuator.

25. A cutting machine for driving a cutting tool in relation to a workpiece, comprising:

a support frame;

a work table situated in relation to the support frame;

a saddle carried by the support frame in relation to the work table for movement relative to the support frame;

a spindle carried by the saddle for linear reciprocation, the spindle having an output end adapted for attachment to the cutting tool;

means for linearly reciprocating the spindle along a spindle axis;

an actuator acting upon the saddle to move the saddle relative to the support frame;

an electrical rotary actuator integral with the saddle and surrounding the spindle, the rotary actuator including a stator mounted to the saddle and rotor mounted via bearings to the saddle for rotation relative to the saddle, the rotor being rotatably coupled to the spindle such that the rotor and the spindle rotate in unison about the spindle axis, the spindle being linearly slidable along the spindle axis relative to the rotor;

a spindle guide secured to the spindle and a spindle guide bushing secured to the rotor, the spindle guide being rotatably coupled to the spindle guide bushing via a spline such that the spindle guide is linearly slidable in the spindle guide bushing.

26. The cutting machine of claim 25, further comprising an encoder comprising a scale and a reader head, the reader head being operably connected to the stator and the rotor to provide rotary position feedback indicating a rotary position of the rotor relative to the stator.

27. The cutting machine of claim 26, further comprising a controller having an electrical output coupled to the stator, the controller responsive to the encoder for closed loop control over the electrical rotary actuator.

28. A cutting machine for driving a cutting tool in relation to a workpiece, comprising:

a support frame;

a work table situated in relation to the support frame;

a saddle supported by the support frame in relation to the work table;

a spindle carried by the saddle for linear reciprocation, the spindle having an output end adapted for attachment to the cutting tool;

and means including an electrical linear motor for facilitating linear reciprocation of the spindle relative to the saddle;

wherein the linear motor drives a hydraulic control valve which regulates hydraulic flow through the saddle to control a hydraulic actuator that hydraulically drives the spindle.

29. The cutting machine of claim 28, wherein the electrical linear motor is coupled to the spindle and linearly reciprocates the spindle.

30. The cutting machine of claim 14, wherein a plurality of linear motors arranged in series act upon the spindle to drive the spindle relative to the saddle.

31. The cutting machine of claim 28, further comprising a linear encoder comprising a reader and a linear scale, the reader and scale being operably mounted to different portions of the linear motor to provide position feedback indicating a linear position of a reciprocating carriage of the linear motor.

32. The cutting machine of claim 31, further comprising a controller having an electrical output coupled to a linear motor coil, the controller responsive to the linear encoder for closed loop control over the linear motor.

33. The cutting machine of claim 28, wherein the saddle is pivotably mounted to the support frame, further comprising means including a second electrical linear motor for pivoting the saddle relative to the support frame about a pivot location.

34. The cutting machine of claim 33, further comprising a back off lever pivotably mounted to the support frame, the back off lever being connected to the second linear motor through a first flexure plate, and the back off lever being connected to the saddle through a second flexure plate, wherein actuation of the second linear motor pivots the back off lever to push and pull the saddle through the second flexure plate and thereby pivot the saddle about the pivot location.

35. The cutting machine of claim 33, further comprising a rotary electrical actuator mounted to the saddle and surrounding the spindle, the rotary electrical actuator having a stator mounted to the saddle and a rotor rotatable relative to the stator, the rotor being coupled to a spindle guide bushing, the spindle being coupled to a spindle guide, the spindle guide being rotatably coupled and linearly slidable within the spindle guide bushing, whereby the rotary electrical actuator is operable to rotate the spindle as the spindle strokes linearly.

* * * * *